(No Model.)

J. C. MACKEY.
COFFEE PERCOLATOR.

No. 256,231. Patented Apr. 11, 1882.

Witnesses:
Walter Fowler.
Edw. Redmond.

Inventor:
John C. Mackey
per atty.
A. H. Evans & Co.

UNITED STATES PATENT OFFICE.

JOHN C. MACKEY, OF NEW YORK, N. Y.

COFFEE-PERCOLATOR.

SPECIFICATION forming part of Letters Patent No. 256,231, dated April 11, 1882.

Application filed February 24, 1882. (No model.)

*To all whom it may concern:*

Be it known that I, JOHN C. MACKEY, of the city and State of New York, have invented a new and useful Improvement in Coffee-Percolators, of which the following is a clear, full, and exact description, reference being had to the accompanying drawings, making a part of this specification, in which—

Figure 1:
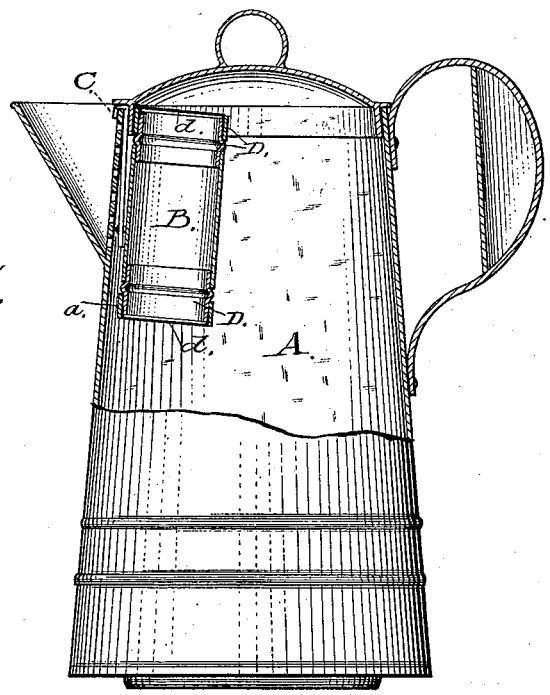
Figure 2:
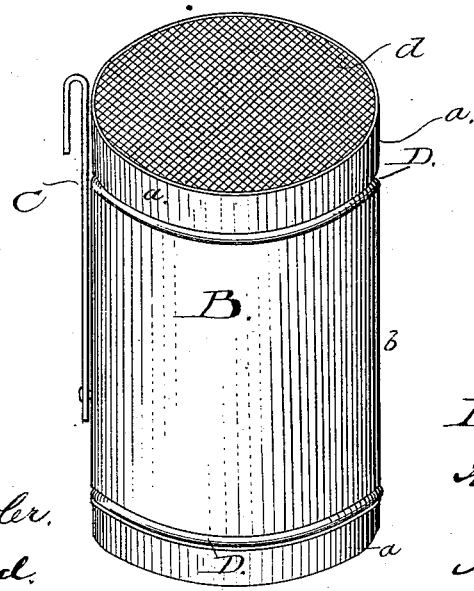

Figure 1 is a sectional view of a coffee-pot with my improved percolator attached. Fig. 2 is a perspective view of the percolator detached from the pot.

My invention relates to that class of percolators in which the ground coffee is placed before it is subjected to the boiling or steaming process; and it consists in the combination of devices hereinafter described and claimed.

In the drawings, A represents a coffee-pot, and B my improved percolator suspended in the upper portion of the pot by means of the hook C. The body $b$ of the percolator is made of sheet metal of any desired shape, cylindrical being the form preferred and shown. Fitting over each head of the cylinder is the cap D, provided with a diaphragm or strainer, $d$, made of any woven fabric, and held in place by means of the metal band $a$, whereby the strainer is readily removed for cleansing or scalding, or for being replaced by a fresh cloth.

The hook C is made in any desirable form, and is properly secured to the cylinder, and by means of this hook the percolator is suspended in the upper portion of the pot and above the body of boiling water.

From this description of my invention it is evident that the steam from the boiling water will condense in the top of the pot and descend through the coffee in the suspended percolator. The steam in rising will also strike up through the ground coffee and extract its essence. As the upper and lower ends of the cylinder are closed by a textile fabric diaphragm, it is evident that the coffee-grains may be reduced to a fine powder without danger of producing muddy coffee, and when so rendered the whole strength of the coffee is much more readily extracted.

Coffee made by means of my improved percolator needs no artificial cleansing to render it ready for use.

The value of my improvement is rendered the more evident when it is considered that it is equally adapted to any ordinary coffee-pot now in use, and does not require a new and special manufacture.

I am aware it is not new, broadly, to cover both ends of a percolator with cloth, as such percolators have been made to rest in the water near the bottom of the pot; but such is not my invention.

Having thus described my invention, what I claim as new, and desire to secure by Letters Patent, is—

In combination with a coffee-pot, the percolator herein described, consisting of the metallic cylinder $b$ and the removable caps D, the latter being each composed of a strainer, $d$, held between an inner ring and an outer ring, $a$, the percolator being adapted to be suspended wholly above the mid-height of the pot, substantially as set forth.

JOHN C. MACKEY.

Witnesses:
EDW. J. REDMOND,
T. WALTER FOWLER.